United States Patent [19]

Van Thyne et al.

[11] 4,394,422
[45] Jul. 19, 1983

[54] BONDED STRUCTURE AND PROCESS OF MAKING SAME

[75] Inventors: Ray J. Van Thyne, 1070 Valley Lake Dr., Inverness, Ill. 60067; John J. Rausch, Rte. 2, Box 177, Antioch, Ill. 60002

[73] Assignees: Ray J. Van Thyne; John J. Rausch; Material Sciences Corporation, all of Mount Prospect, Ill.

[21] Appl. No.: 271,127

[22] Filed: Jun. 8, 1981

[51] Int. Cl.³ .......................... B32B 3/28; C23C 9/00
[52] U.S. Cl. ................................... 428/592; 428/593; 428/594; 428/603; 428/610; 428/682; 427/431; 228/181; 228/194
[58] Field of Search ............... 428/594, 593, 610, 592, 428/681, 685, 682, 941, 603; 427/433, 431; 228/181, 194, 259

[56] References Cited

U.S. PATENT DOCUMENTS

| | | | |
|---|---|---|---|
| 3,620,816 | 11/1971 | Rausch | 427/433 |
| 3,778,299 | 12/1973 | Rausch | 427/433 |
| 4,168,333 | 9/1979 | Rausch | 427/433 |
| 4,205,118 | 5/1980 | Schubert | 428/593 |
| 4,242,420 | 12/1980 | Rausch | 428/667 |
| 4,247,422 | 1/1981 | Davies | 252/465 |

*Primary Examiner*—L. Dewayne Rutledge
*Assistant Examiner*—J. J. Zimmerman
*Attorney, Agent, or Firm*—Dithmar, Stotland, Stratman & Levy

[57] ABSTRACT

Two ferrous-based components are bonded together to form a bonded structure and simultaneously a layer is diffused into the surfaces of the components. The process involves first placing the components in juxtaposition, and contacting the juxtaposed components with a molten lead bath having at least one diffusing element therein. One component may be a corrugated sheet and the other may be an uncorrugated or less corrugated sheet, the sheets being in the form of helixes interposed in each other to create a substantial number of fold lines being in contact with the surface of the uncorrugated sheet. Alternately, a sheet with projections may be used in place of the corrugated sheet.

24 Claims, 15 Drawing Figures

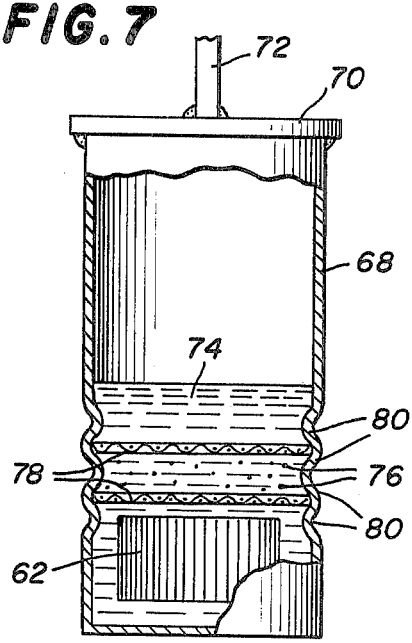
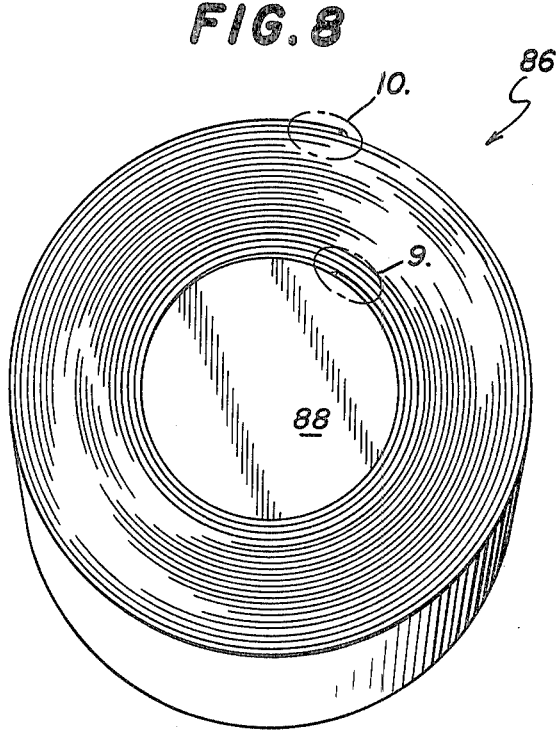
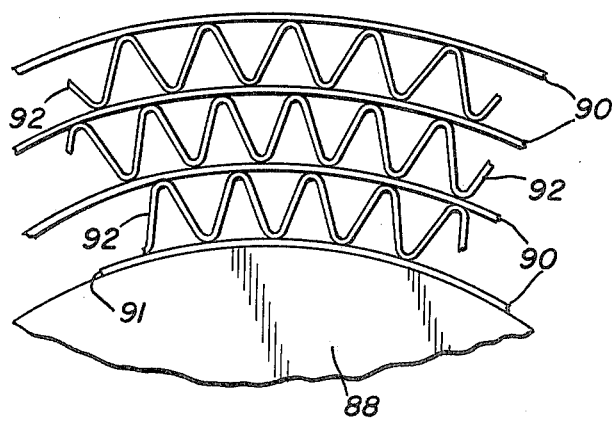
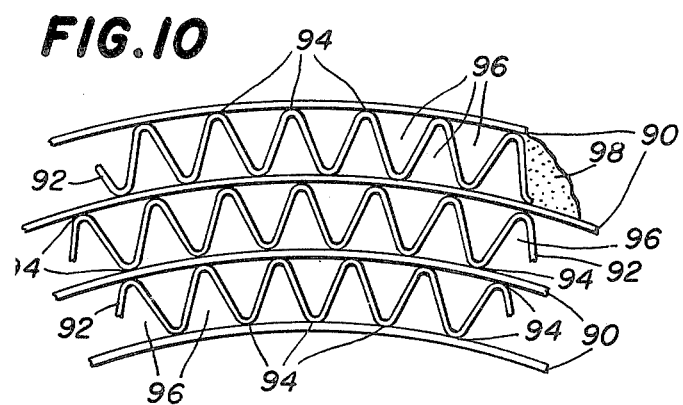
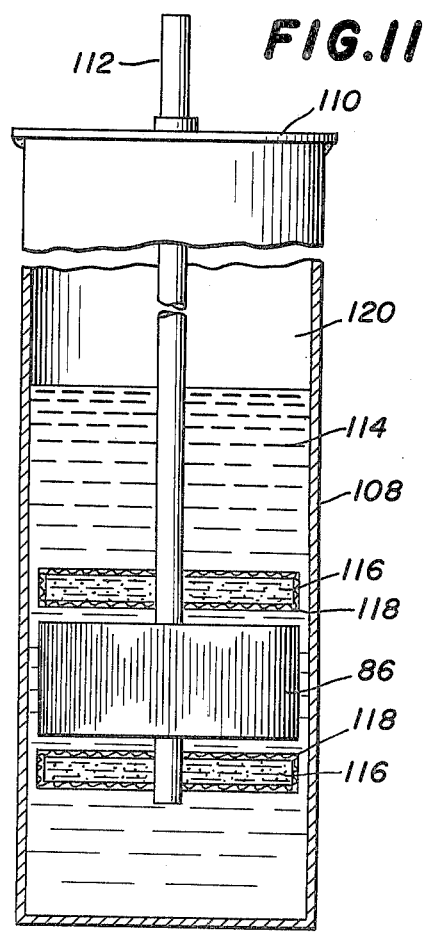

BONDED STRUCTURE AND PROCESS OF MAKING SAME

BACKGROUND OF THE INVENTION

U.S. Pat. No. 3,620,816, which issued to the same individuals named as applicants herein, describes a process of diffusion alloying the surface of a ferrous part in a molten lead medium. In that process, elements such as chromium are dissolved into the molten lead, and the lead is placed in contact with the ferrous part to be surfaced. The diffusing element is alloyed into the surface of the part by metallic diffusion at elevated temperatures. The process has been applied simultaneously to multiple small parts where bonding of the parts must be avoided. U.S. Pat. No. 3,778,299, which also issued to the same individuals named as applicants herein, describes a method to avoid bonding in the processing of multiple small parts.

There are situations where bonding of parts is necessary. Such parts may be bonded together by any of several well-known methods, such as by brazing or self-interdiffusion. In the latter process, heat will cause the surface of one component to diffuse into the other, and vice versa. If, in addition, it is desired to have a diffused layer in these parts, a second separate operation would be necessary.

Fabrication of honeycomb structures presents special problems in bonding. Such stuctures may be made by utilizing alternate layers of corrugated sheet and uncorrugated (or less corrugated) sheet. Alternatively, the corrugated and uncorrugated sheets may be simultaneously wrapped to provide interposed helical configurations. Either structure results in the creation of a multiplicity of parallel channels. In certain uses of such honeycomb structures, it is important that the uncorrugated sheet be securely bonded to the corrugated sheet at the lines of contact between the two sheets to cause fluid to flow only axially through the channels and preclude fluid flow transverse thereto. For example, such honeycomb structures may be used in energy-saving heat regenerator wheels or as substrate carriers for catalytic converters. In other applications, transverse fluid flow is acceptable. In either case, it is important that the product be unitary by way of substantial bonding throughout.

Such structures may be made of stainless steel sheet, in order to withstand the high temperatures to which they may be subjected. However, it is difficult to form stainless steels and other high temperature alloys very thin (e.g., gauges of two mils.) and then corrugate. It is also difficult to obtain consistent bonding throughout the product. As explained above, this is particularly significant where transverse fluid flow must be avoided.

SUMMARY OF THE INVENTION

It is, therefore, an important object of the present invention to provide an improved process for bonding together ferrous-based components, while creating a layer diffused into the surface of each.

Another object is to provide an improved bonded structure comprised of two ferrous-based components, while creating a layer diffused into the surface of each.

Another object is to produce a honeycomb structure which is made using steel, rather than stainless, but which is then chromized and/or aluminized to provide a structure with high temperature resistance.

Another object is to provide a process whereby two ferrous-based components made by cold-forming, machining or powdered metallurgy techniques may be locked together by press fitting and thereafter processed to provide a unitary bonded structure, while creating a layer diffused into the surface of each.

Another object is to provide a diffusion layer on the surface of two ferrous-based components and at the same time bond the components together.

In summary, there is provided a process of bonding together at least two ferrous-based components to form a bonded structure and simultaneously diffusing a layer into the surfaces of the components, comprising placing the components in juxtaposition, and contacting the juxtaposed components with a molten alloy bath consisting essentially of lead and at least one diffusing element, thereby to create a layer diffused into the surfaces of both of the components which bonds them together.

This process may be used to make a bonded structure comprising a corrugated sheet of ferrous-based material having a multiplicity of fold lines, an uncorrugated or less corrugated sheet of ferrous-based material, the sheets being in the form of helixes interposed in each other such that a substantial number of the fold lines contact a surface of the uncorrugated sheet, and a layer diffused into the surfaces of both of the sheets so as to bond the corrugated sheet at the fold lines thereof to the uncorrugated sheet. Alternately, a sheet with projections may be used in place of the corrugated sheet. In another embodiment, alternating sheets of corrugated and uncorrugated (or less corrugated) ferrous-based materials may be utilized.

The invention consists of certain novel features and a combination of steps and parts hereinafter fully described and particularly pointed out in the appended claims, it being understood that various changes in the details may be made without departing from the spirit, or sacrificing any of the advantages of the invention.

BRIEF DESCRIPTION OF THE DRAWINGS

For the purposes of facilitating an understanding of the invention, there is illustrated in the accompanying drawings, preferred embodiments thereof, from an inspection of which, when considered in connection with the following description, the invention, its construction, and operation, and many of its advantages should be readily understood and appreciated.

FIG. 7 schematically depicts a sealed tube containing the bonded structure depicted in FIG. 5, to show the way in which it is made;

FIG. 8 illustrates another embodiment of the present invention constructed of a helical corrugated sheet interposed with a helical less corrugated sheet;

FIG. 9 is a greatly enlarged schematic view of the portion of FIG. 8 within the area marked "9";

FIG. 10 is a greatly enlarged schematic view of the portion of FIG. 8 with the area marked "10";

FIG. 11 schematically depicts a retort containing the bonded structure depicted in FIG. 8, to show the way in which it is made;

DESCRIPTION OF THE PREFERRED EMBODIMENTS

In bonding two or more ferrous-based components, they are juxtaposed and the part thus formed is placed in a molten lead bath, in which one or more alloying elements are present. Chromium is an important alloying element and may be in elemental form or in various alloy forms such as ferrochromium. Aluminum may be employed in certain instances as a diffusing element. The temperature of the bath is normally between 1,600° F. and 2,500° F. and the parts are in the bath for a time from on the order of minutes to twenty-four hours. Chromium is thus diffused into the surfaces of the components of each part to provide not only an alloyed surface, but also a bond for the components.

Figure 1:
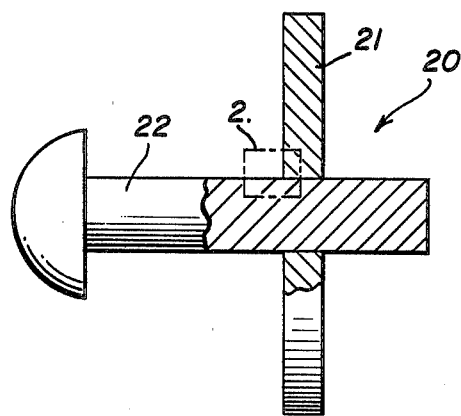
FIG. 1 depicts a headed shaft mated with a washer, the part thus formed being shown partially in transverse cross section, which part has been processed in accordance with the features of the present invention.
Figure 2:
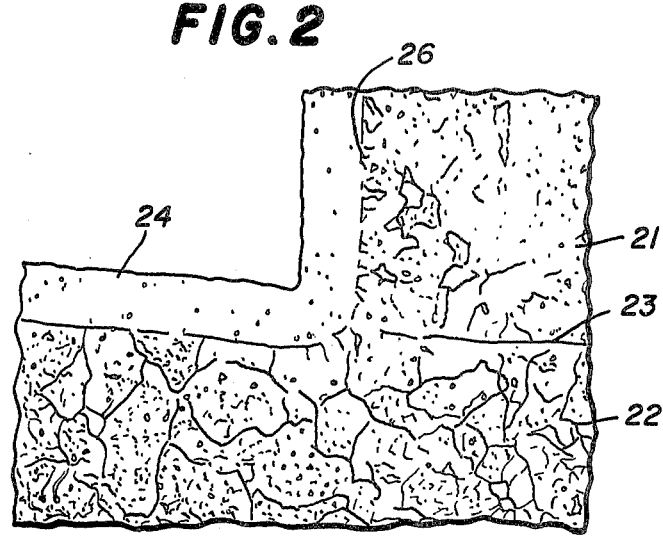
FIG. 2 is a greatly enlarged view (magnification 100 X) of the portion of FIG. 1 within the block labelled "2"
Figure 3:
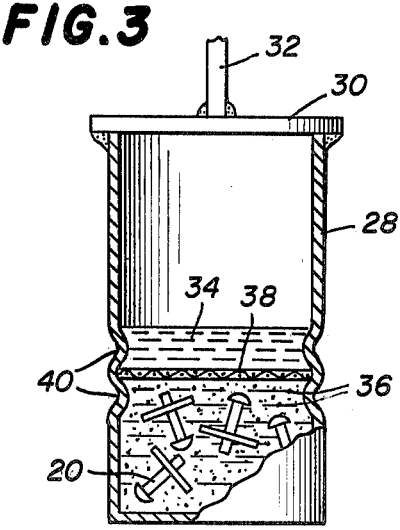
FIG. 3 schematically depicts a sealed tube containing several of the parts of FIG. 1, to show the way in which they were processed.

Turning now to the drawings, and more particularly to FIGS. 1-3 thereof, there is depicted therein a first embodiment of the invention. A part 20 is made with a washer 21 press-fit onto a headed shaft 22, both being composed of ferrous-based material. The diameter of the shaft 22 is substantially equal to the diameter of the hole in the washer 21, so that the press fit is snug. The part 20 is treated in a lead bath containing granular chromium, causing chromium to diffuse into the exposed surfaces of the washer 21 and the shaft 22. The part 20 was thereby given the properties of stainless steel, including ability to withstand high temperature. Furthermore, the diffused chromium layer bonds the washer 21 and the shaft 22 together.

To analyze the character of the layer and the bond, the part 20 is sliced through the longitudinal axis of the shaft and mounted in BAKELITE. The cut surfaces of the part 20 are ground and polished to create a mirror-like surface. That surface is treated with a solution of nitric acid and alcohol, which solution attacks the ferrous substrate but does not attack the chromized layer.

FIG. 2 depicts a photograph of the juncture 23 of the surfaces (at a magnification of 100 times) of the washer 21 and the shaft 22 after having been polished and treated with the nitric acid/alcohol solution. A chromized layer 24 is present on the exposed surfaces of the washer 21 and the shaft 22. The line 26 represents the demarcation between a chromium content in excess of 11% and one less than 11%. In other words, the nitric acid/alcohol solution attacks the substrate only if its chromium concentration is less than 11%. Actually, the chromium concentration decreases continuously from a maximum at the outside surface of the layer 24, to zero inwardly of the line 26.

FIG. 3 schematically depicts equipment for treating several of the parts 20. A tube 28 has welded thereto a cover 30 which carries an upstanding rod 32. The tube 28 contains a molten alloy bath in which the transfer agent is lead 34. The bath also contains granular chromium 36 and four of the parts 20. A perforated disc 38 held in place by retaining rings 40 prevents the shaft/washer parts from floating. The perforations are small enough to preclude passage of the chromium 36. In assembling the equipment, the parts 20 and the chromium 36 are dropped into the tube 28. Then, the tube 28 is deformed to create the lower one of the rings 40, the disc 38 is dropped into place, and then the upper one of the rings is created by deforming the wall of the tube 28. A slug of solid lead is placed on the disc 38 and the cover 30 is welded into place. The entire unit is placed in a furnace (not shown) to cause the slug to melt and provide molten lead 34. The rod 32 may be used to agitate the parts while they are being treated, if that is desired.

Chromium is diffused into the surfaces of the parts 20 by way of the lead transfer agent. After a period of time, the parts 20 are removed and treated to remove excess lead. The details of this processing are described in greater detail in U.S. Pat. No. 3,620,816 mentioned above. It is to be understood that the equipment shown in FIG. 3 is schematic and any number of different kinds and shapes of containers may be employed.

In an actual example of the embodiment of FIGS. 1-3, the waster 21 had a 0.125 inch thickness and a hole approximately 0.1 inch in diameter. Both the washer 21 and the shaft 22 were composed of steel containing about 0.01% by weight carbon. The shaft 22 was 1006 steel which was decarburized to a 0.01% concentration. Ten parts 20 were diffusion treated in an evacuated-and-sealed tube 28 that was 1.25 inches in diameter and contained 10 grams of chromium and 600 grams of lead. The tube 28 was stationary and the treatment took place at a temperature of 2,000° F. for four hours. The parts 20 were removed and deleaded by suitable chemical procedures, sliced longitudinally, mounted in BAKELITE, and polished and etched in a solution of 5% nitric acid and 95% alcohol. The layer 24 of greater than 11% chromium concentration at the surface of the part 20 was found to be about 4 mils. thick. It was determined that the washer 21 and the shaft 22 were bonded together with no bonding at the steel-to-steel interface juncture 23 between the two.

The process of diffusing an element, such as chromium, into two adjacent ferrous-based parts to bond them together is also useful in producing parts having a multiplicity of channels of minute cross section extending parallel to one another.

Figure 4:
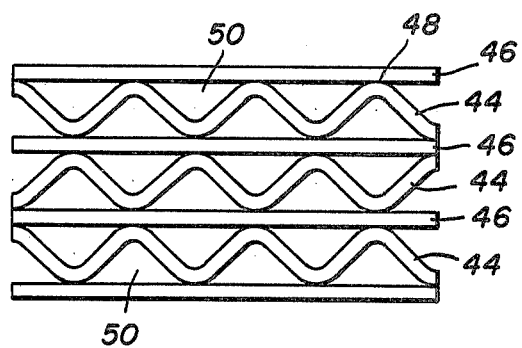
FIG. 4 depicts a second embodiment of the present invention.

There is shown in FIG. 4 an embodiment of such a structure, having alternating corrugated sheets 44 and uncorrugated sheets 46. In this application, the term "sheet" is used to define a product from 0.045 inch or more in thickness down to thicknesses of 2 mils. or less. Although thinner sheet is commonly characterized as "foil" (8 mils. or less in thickness), the term "sheet" used herein encompasses foil also. Each corrugated sheet 44 is defined by a multiplicity of fold lines 48 which respectively contact the surfaces of the sheets 46. When the sheets 44 and 46 are interconnected, a multiplicity of generally triangularly shaped channels 50 is created. It is important to obtain a good bond along the entire extent of each of the fold lines 48. A complete bond is particularly important if this part is to be used to direct fluid flow along the axes of the channels 50 and not transversely thereto. It can be appreciated that if the bonds are incomplete, some transverse flow of the fluids will occur. The part depicted in FIG. 4 may be treated in the equipment shown in FIG. 3 to create a diffusion layer on all of the exposed surfaces of the sheets 44 and 46 and thus to create the desired bond between the two.

In an actual example of this embodiment, each of the sheets 44 and 46 had a thickness of 0.045 inch and was made of steel containing about 0.01% by weight carbon. The corrugations of the sheet 44 were such as to create a spacing of 0.1875 inch between the sheets 46. The structure shown in FIG. 4 was clamped together (spot welding or stapling could have been used) and treated in an evacuated and sealed two-inch diameter tube such as that shown in FIG. 3. The tube contained 15 grams of chromium and 1,400 grams of lead. The part was treated for four hours without movement of the tube at a temperature of 2,000° F. Thereafter, the part was removed from the bath, deleaded and found to have all exposed surfaces diffused with chromium. The corrugated sheets 44 were bonded to the sheets 46 at the fold lines 48.

Figure 5:
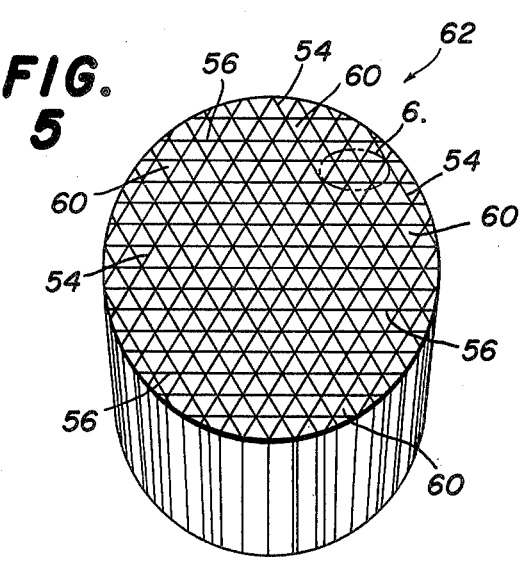
FIG. 5 depicts a third embodiment of the present invention.
Figure 6:
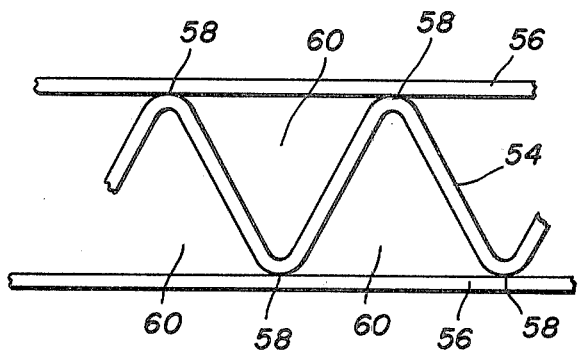
FIG. 6 is a greatly enlarged view of the portion of FIG. 5 with the area outlined in phantom and labelled "6"

Turning now to FIGS. 5 and 6, there is depicted therein a further embodiment of the present invention. In this embodiment, corrugated sheets 54 alternate with uncorrugated sheets 56. Actually, as will be seen, the sheets 56 are actually less corrugated than the sheets 54, rather than truly "uncorrugated". The sheets 56 normally will be crinkled. The sheets 56 may, however, be corrugated. Each corrugated sheets 54 is defined by a multiplicity of fold lines 58 which respectively contact surfaces of the uncorrugated sheets 56. When the sheets 54 and 56 are interconnected, a multiplicity of generally triangularly-shaped channels 60 is created. A cylindrical slug 62 is cut from the structure, the axis of which slug is parallel to the axes of the channels 60. The sheets 54 and 56 are held together for subsequent processing by spot welding or by wire wrapping.

FIG. 7 schematically depicts equipment for treating the cylindrical slug 62. A tube 68 has welded thereto a cover 70, which carries an upstanding rod 72. The tube 68 contains an alloy bath in which the transfer agent is lead 74. The bath also contains granular chromium 76 and the slug 62. A pair of perforated discs 78 are held in place by retaining rings 80 to contain the chromium 76. The lower one of the discs 78 prevents the slug 62 from floating. In this embodiment, two perforated discs 78 are employed to prevent chromium particles from becoming wedged into the channels 60 which have such tiny cross sections.

The equipment of FIG. 7 is assembled by placing the slug 62 and the chromium 76 in the tube 68. The tube 68 is deformed to create the lowest one of the rings 40, the lower disc 78 is dropped into place, and then the next ring 80 is created. The other two rings 80 and the upper disc 78 are then applied after the chromium is added. A slug of solid lead is placed on the upper disc 78 and the cover 70 is welded into place. The rod 72 may be used to agitate the slug 62 while it is being treated, if that is desired. The covered tube 68 is inserted into a furnace to cause the slug to melt and provide the molten lead 74. Chromium is diffused into the surfaces of the slug 62 by way of the lead transfer agent. After a period of time, the slug 62 is removed and treated to remove excess lead, generally in the same way as the part of FIG. 4 was treated.

In an actual example of this embodiment, each of the sheets 54 and 56 had a thickness of two mils. and was made of steel containing about 0.14% by weight carbon. The corrugations of the sheet 54 were such as to create a spacing of 0.04 inch between the sheets 56. The fold lines 58 were spaced 0.05 inch. After assembly, a cylindrical slug was cut from this assembly to produce a part 0.75 inch in diameter by one inch in length. The slug 62 is placed in the tube 68 shown in FIG. 7 with the channels 60 parallel to the axis of the tube axis. The slug 62 was treated at a temperature of 2,000° F. for a total time of twenty minutes. Actually, the slug 62 was cold when it was placed in the tube and reached a temperature of 2,000° F. in about six minutes. Accordingly, the treatment at 2,000° F. actually took place for about fourteen minutes. Using the rod 72, the tube was shook periodically to facilitate flow of lead through the channels 60. The slug 62 was removed from the bath and deleaded. To analyze the chromium content in the slug 62, a slice was taken off each end and a slice was taken out of the center. It was found that the end positioned at the top, as viewed in FIG. 7, had a content of 14.96% chromium by weight, the center slice had a chromium content of 14.3%, while the other end had a chromium content of 12.52%. The concentrations were surprisingly uniform. The chromium did not diffuse through the entirety of the two mil. thickness of the sheets 54 and 56. Instead, there was a 0.4 mil. core of material having a chromium content of less than 11%. The chromium concentration to a depth of 0.8 mil. on each surface was greater than 11%. Actually, the chromium concentration was 15 to 20% at the surfaces and 0 at the center.

A further embodiment of the present invention is depicted in FIGS. 8-10. The part 86 is generally cylindrical and has a cylindrical hub 88. An uncorrugated (or relatively uncorrugated) sheet 90 of ferrous-based material and a corrugated sheet 92 of ferrous-based material are wound around the hub 88 so as to create a pair of interposed helixes. The corrugated sheet 92 is defined by a multiplicity of fold lines 94 which respectively contact surfaces of the uncorrugated sheet 90. When the sheets 90 and 92 are interconnected, a multiplicity of generally triangularly shaped channels 96 are created.

In making the part 86, there is provided a supply of uncorrugated, ferrous-based sheet 90 and a supply of corrugated, ferrous-based sheet 92. The end of the corrugated sheet 92 is placed on top of the end 91 (FIG. 9) of the uncorrugated sheet 90 and the juxtaposed ends are secured to the hub 88, as by welding. The sheets 90 and 92 are then rolled simultaneously about the hub until a cylinder of desired diameter is generated. The sheets 90 and 92 are then severed, and their free ends are attached to the adjacent flight of the sheet 90 as by welding 98 (FIG. 10).

In order to diffuse chromium into the surfaces of the sheets 90 and 92, the equipment depicted in FIG. 11 may be used. A retort 108 has sealingly clamped thereto a cover 110 through which reciprocally passes an upstanding rod 112. The retort 108 contains an alloy bath in which the transfer agent is lead 114. The part 86 is secured to the rod 112 such that the channels 96 are disposed vertically. Granular chromium 116 is added to each of two screened cages 118 attached to the drive rod 112 above and below the part 86. These cages contain granular chromium 116. The region 120 in the retort 108 not occupied by lead is evacuated and preferably filled with an inert gas. The retort 108 is heated externally by a furnace. The rod 112 is oscillated to move the part 86 up and down while it is being processed.

In an actual example of this embodiment, the part 86 had a seven-inch diameter and a three-inch height and the diameter of the hub 88 was 3.5 inches. The part 86 was first cleaned by a solvent degreasing. The retort 108 was made of stainless steel, had a eight-inch diameter, was 4 feed high and held 200 pounds of lead 114. The region 120 was evacuated and back filled with argon. Each of the screened cages 118 contained about one pound of granular chromium 116. The rod 112 was reciprocated by a double acting, air cylinder. The part 86 was chromized at a temperature of 1,700° F. for eighteen hours at a pumping rate of six inches per minute. After completion of the processing, the part 86 was found to have chromium diffused into all the exposed surfaces of both the uncorrugated sheet 90 and the corrugated sheet 92, which diffused layer served to bond the corrugated sheet 92 at the fold lines 94 thereof to the adjacent surfaces of the uncorrugated sheet 90. Metallographic examination of the part 86 showed that about 90% of the cross section of each of the sheets 90 and 92 had a chromium content of at least 12%. As expected, a minor growth in thickness of the sheets occurred.

To analyze the chromium content in the part 86, a slice was taken off each end asnd a slice was taken out of the center. It was found that the end positioned at the top, as viewed in FIG. 11, had a content of 18.32% chromium by weight, the center slice had a chromium content of 15.90%, while the other end had a chromium content of 20.29%.

Instead of welding, the trailing ends of the sheets 90 and 92 can be stapled or the part 86 can be wrapped with wire. Any such procedure may be utilized to maintain the fold lines 94 in contact with the surfaces of the sheet 90 during chromizing. Instead of wrapping the sheets 90 and 92, the hub 88 can be rotated to accomplish the same purpose.

Figure 12:
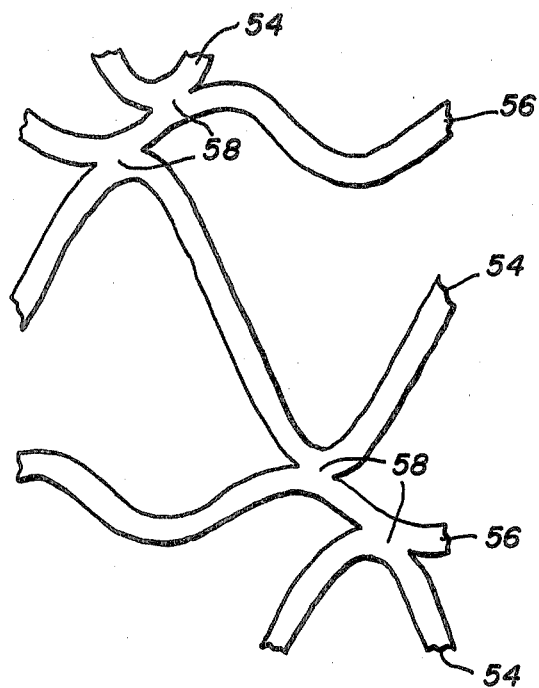
FIG. 12 is a fragmentary cross section (60 X magnification) of the alternating layers of the bonded structures of FIGS. 8—11 midway between the ends thereof.

A second example of the embodiment of FIGS. 8–10 was constructed using the equipment of FIG. 11. The pumping speed was increased to 28 inches per minute causing chromizing to occur essentially throughout the two-mil. cross section of the sheets 90 and 92. FIG. 12 depicts a cross-sectional view of this second example of the part 86, taken about midway between the ends thereof at a magnification of 60 times. Contrary to the idealized and schematic representation in FIGS. 9 and 10, this actual representation shows that the sheets 56 are not planar but rather are crinkled; they may be said to be less corrugated than the corrugated sheet 54. Furthermore, the fold lines 58 are not aligned in adjacent flights of the corrugated sheet 54, as it appears in FIGS. 8 and 10. That is, of course, to be expected. It is also noteworthy that there is no line of demarcation between the fold lines 58 and the surfaces of the uncorrugated or relatively uncorrugated sheet 56. Actually, the corrugated sheets 54 have become unitary with the uncorrugated sheets 56. This is because the chromium has diffused substantially through the entire thicknesses of the sheets 54, as previously explained, causing the sheets 54 and 56 to become perfectly bonded. There may be some occasional nodules of unreacted iron in the center of the joints because of the thickness thereof compared to the thickness of the sheets 54 and 56. Nevertheless, excellent diffusion bonding has occurred.

To analyze the chromium content in the part 86 made in this example, a slice was taken off each end and a slice was taken out of the center. It was found that the end positioned at the top, as viewed in FIG. 11, had a content of 22.60% chromium by weight, the center slice had a chromium content of 21.77%, while the other end had a chromium content of 24.34%.

A third example of the embodiment of FIG. 10 was constructed, using the equipment of FIG. 11. Again, one pound of chromium was placed in each of the cages 118, but in addition, 0.13 pounds of aluminum was added when the temperature of the bath reached 1,500° F. Aluminum improves the oxidation resistance of the part 86. Processing was performed at 1,900° F. for 2.5 hours at a pumping speed of two inches per minute, using a four-inch stroke. To analyze the chromium content in the part 86 made in accordance with this third example, a slice was taken off each end and a slice was taken out of the center. It was found that the end positioned at the top, as viewed in FIG. 11, had a content of 16.88% chromium by weight and 3.4% aluminum by weight, the center slice had a chromium content of 17.61% and an aluminum content of 2.48%, while the other end had a chromium content of 19.30% and an aluminum content of 5.51%.

A fourth example of the part 86 was made in the equipment of FIG. 11, using the same processing conditions as the third example, except that 0.53 pound of aluminum was added to the bath when the temperature reached 1,500° F. Again, good bonding was achieved. Slices were removed as in the previous example. The one at the end positioned near the top, as viewed in FIG. 11, had a chromium content of 16.72% and an aluminum content of 8.77%. The center slice had a chromium content of 20.34% and an aluminum content of 8.05%, and the bottom end had a chromium content of 15.71% and an aluminum content of 6.52%.

A microprobe analysis was performed on a polished cross section of the sheet in the part 86, with the following results:

| Distance from Surface (mils.) | % Al | % Cr |
| --- | --- | --- |
| 0.1 | 7.20 | 26.71 |
| 0.3 | 7.12 | 24.80 |
| 0.6 | 7.50 | 21.58 |
| 0.9 | 7.25 | 18.91 |
| Center | 7.04 | 16.96 |
| 0.9 | 7.33 | 18.71 |
| 0.6 | 7.03 | 19.87 |
| 0.3 | 7.02 | 22.33 |
| 0.1 | 6.93 | 23.96 |

As expected, some gradient of chromium exists. The aluminum content is surprisingly constant, which is desirable since embrittlement occurs if the aluminum content at the surface is high.

Figure 15:
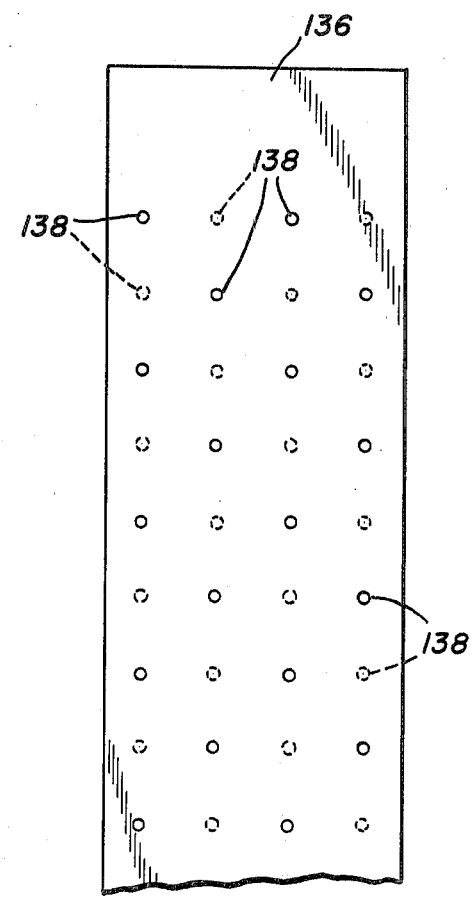
FIG. 15 is a fragmentary end view of one of the sheets bearing projections.
Figure 13:
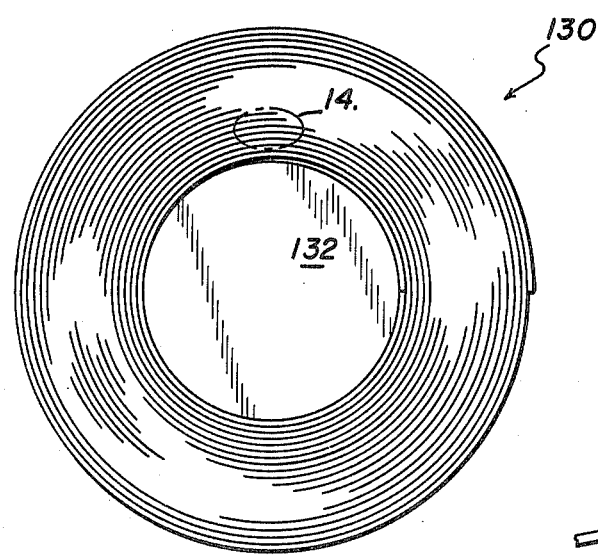
FIG. 13 illustrates another embodiment of the present invention constructed of a helical sheet bearing projections interposed with a plain helical sheet.
Figure 14:
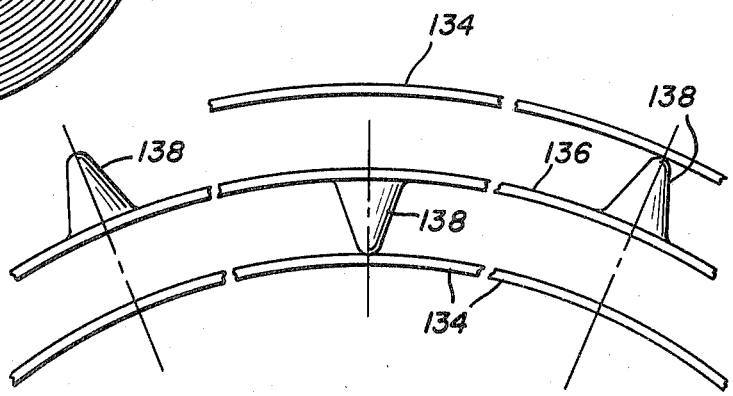
FIG. 14 is a greatly enlarged view of the portion of FIG. 13 with the area marked "14"

A further embodiment of the present invention is depicted in FIGS. 13–15. The part 130 is generally cylindrical and includes a cylindrical hub 132, a sheet 134 of ferrous-based material, and a sheet of ferrous-based material 136 with projections 138. The projections 138 protrude from both surfaces of the sheet 136. The sheets 134 and 136 are wound around the hub 132 so as to create a pair of interposed helixes. As with the part 86, the ends of the sheets 134 and 136 are placed in juxtaposition and secured to the hub 132 as by welding. The sheets 134 and 136 are wound around the hub until a cylinder of desired diameter is generated. The sheets 134 and 136 are then severed, and their free ends attached to the adjacent flight of the sheet 134 as by welding or by clips.

In order to diffuse chromium into the surfaces of the sheets 134 and 136, the equipment of FIG. 11 may be used. After completion of such processing, the part 130 will have chromium diffused into all of the exposed surfaces of both the sheets 134 and 136, which diffused layer serves to bond the tips of the projections 138 to the sheet 134.

In this particular embodiment, the sheet 136 had four rows of projections 138 alternating between the surfaces of the sheet.

The part 130 does not have the well-defined channels of the parts in the embodiments of FIGS. 4, 5-6 and 8-10. Instead, the projections 138 simply serve to space the sheets apart. The part 130 cannot be used to direct fluid flow only parallel to its axis; circumferential fluid flow will also occur.

The chromium content may be controlled to desired levels by adjusting the amount of chromium added to the lead bath. Parts containing 5-30% chromium and 3-18% aluminum are readily made by the process described herein, whereby the parts will have excellent oxidation resistance at high temperatures in air or other environments. Preferably, the content is 5-15% aluminum and 5-18% chromium, so that the parts will have excellent properties, while minimizing the requisite amount of chromium and aluminum. Good corrosion or oxidation resistance may also be achieved by diffusion of chromium alone or aluminum alone.

In preparing the parts for treatment in the molten alloy bath, various methods may be used to hold the components together such as frictional engagement, mechanical clamps, tack welding, stapling and the like.

The process described herein is particularly applicable in making parts including sheets. 0.020 inch in thickness or less because such sheet can be alloyed throughout its thickness when processed for five hours at temperatures of less than 2,100° F.

The foregoing examples generally relate to the use of unalloyed, low carbon steel as the starting material. Other ferrous-based substrates may be used and certain alloying may be employed to advantage. For example, elements that enhance corrosion or oxidation resistance may be present in the substrate steel, but should be limited to retain good fabricability of the starting steel substrate. Whereas diffusion of chromium and aluminum have been described, other elements that enhance corrosion or oxidation resistance such as cobalt, nickel, manganese, titanium and vanadium may also be used in the lead bath and diffused into the steel substrate.

After processing of the part and deleading, its properties may be further enhanced by vacuum or inert-atmosphere heat treatment to level the composition gradient in the diffused alloy material or remove additional lead. Other treatment such as peroxidation may enhance the oxidation resistance.

The foregoing description has referred to sheets that are initially unbonded and are bonded by means of a layer of chromium or other diffusing element diffused into the surface of the two components. However, it is to be understood that there can be initial bonding at the lines or points of contact between the components. In that case, the process described herein provides additional or enhanced bonding.

What has been described therefore is an improved bonded structure consisting of two ferrous-based components which are bonded together, while creating a layer diffused into the surface of each. There is also disclosed a process for making the structure by diffusing an element into the surfaces of the components.

We claim:

1. A bonded structure comprising at least two adjacent ferrous-based components having a layer diffused in the surface of both of said parts to bond them together, wherein both of said components are sheets of ferrous-based material and at least one of said sheets has spacer means bonded to the other of said sheets to create at least one channel therebetween, said bonded structure being made by the steps of placing said components in juxtaposition, and contacting said juxtaposed components with a molten alloy bath consisting essentially of lead and at least one diffusing element, thereby to create a layer diffused into the surfaces of both of said components which bonds them together.

2. The bonded structure of claim 1, wherein said spacer means are corrugations, so that a multiplicity of said channels are created thereby.

3. The bonded structure of claim 1, wherein said spacer means are projections.

4. The bonded structure of claim 1, wherein said layer is diffused throughout the thickness of said sheets and said spacer means.

5. The bonded structure of claim 1, wherein said sheets define a single helical channel.

6. The bonded structure of claim 1, wherein said layer is composed of at least one element selected from the group of elements consisting of chromium, aluminum, cobalt, nickel, manganese, titanium and vanadium.

7. The bonded structure of claim 1, wherein said layer is chromium and aluminum.

8. The bonded structure of claim 1, wherein said layer contains 5-30% chromium.

9. The bonded structure of claim 1 wherein said layer contains 3-18% aluminum.

10. A bonded structure comprising a corrugated sheet of ferrous-based material having a multiplicity of fold lines, a further sheet of ferrous-based material, said sheets being in the form of helixes interposed in each other such that a substantial number of said fold lines contact a surface of said further sheet, and a layer diffused into the surfaces of both of said sheets so as to bond said corrugated sheet at the lines of contact thereof to said further sheet so as to create a multiplicity of parallel channels.

11. The bonded structure of claim 10, being made by the steps of providing a supply of said corrugated sheet and a supply of said further sheet, placing the ends of said sheets in juxtaposition, whereby the fold lines of said corrugated sheet will contact a surface of said further sheet, wrapping said sheets simultaneously about an axis parallel to the corrugations in said corrugated sheet until a cylinder of desired diameter is generated, severing the balance of said sheets, attaching the free ends of said sheets at least to the adjacent flight of one of said sheets, and contacting said sheets with a molten alloy bath consisting essentially of lead and at least one diffusing element, thereby to create a layer diffused into the surfaces of both of said sheets which bonds them together.

12. The bonded structure of claim 11, wherein said diffusing element is chromium.

13. The bonded structure of claim 11, wherein said bath has at least two diffusing elements being chromium and aluminum.

14. The bonded structure of claim 11, wherein said sheets are simultaneously wrapped about a cylindrical hub.

15. The bonded structure of claim 11, wherein said sheets are reciprocated while in said bath in directions parallel to the axes of said channels.

16. The bonded structure of claim 11, wherein said one diffusing element is in the form of granules and is isolated from said sheets in order to prevent said granules from clogging the channels of said bonded structure.

17. A bonded structure comprising a first sheet of ferrous-based material having a multiplicity of projections, a second sheet of ferrous-based material, said sheets being in the form of helixes interposed in each other such that a substantial number of said projections contact a surface of said second sheet, and a layer diffused into the surfaces of both of said sheets so as to bond said first sheet at the projections thereof to said second sheet.

18. The bonded structure of claim 17, being made by the steps of providing a supply of said second sheet and a supply of said first sheet, placing the ends of said sheets in juxtaposition, whereby the projections of said first sheet will contact a surface of said second sheet, rolling said sheets simultaneously about an axis parallel to the side of said sheets until a cylinder of desired diameter is generated, severing the balance of said sheets, attaching the free ends of said sheets at least to the adjacent flight of one of said sheets, and contacting said sheets with a molten alloy bath consisting essentially of lead and at least one diffusing element, thereby to create a layer diffused into the surfaces of both of said sheets which bonds them together.

19. The bonded structure of claim 18, wherein said diffusing element is chromium.

20. The bonded structure of claim 18, wherein said bath has at least two diffusing elements being chromium and aluminum.

21. A bonded structure comprising a plurality of corrugated sheets of ferrous-based material each having a multiplicity of fold lines, a plurality of further sheets of ferrous-based material, said corrugated sheets alternating with said further sheets such that a substantial number of said fold lines contact a surface of said further sheets, and a layer diffused into the surfaces of all of said sheets so as to bond said corrugated sheets at the fold lines thereof to the adjacent further sheets.

22. The bonded structure of claim 21, being made by the steps of providing a supply of corrugated sheets and a supply of further sheets, arranging said sheets into a stack in which said corrugated sheets alternate with said further sheets, clamping the stack so that the sheets therein remain in place, contacting said sheets with a molten alloy bath consisting essentially of lead and at least one diffusing element, thereby to create a layer diffused into the surfaces of both of said sheets which bonds them together.

23. The bonded structure of claim 22, wherein said diffusing element is chromium.

24. The bonded structure of claim 22, wherein said bath has at least two diffusing elements being chromium and aluminum.

* * * * *